No. 671,802. Patented Apr. 9, 1901.
A. LAWRENCE.
LAWN TRIMMER.
(Application filed Oct. 6, 1900.)
(No Model.)
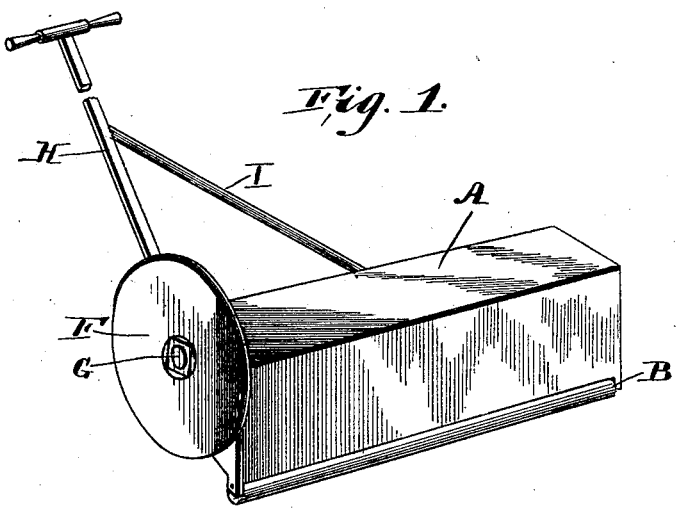
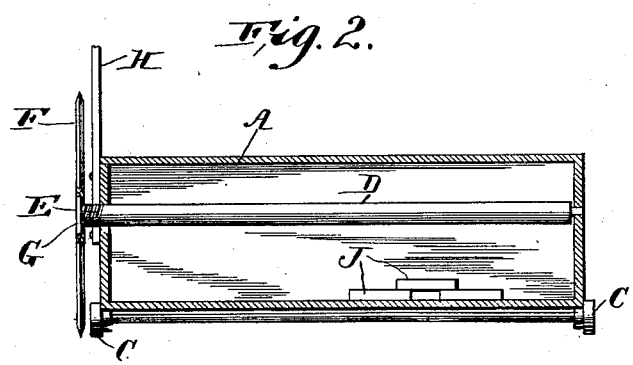
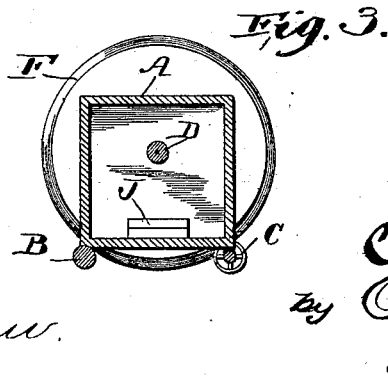
Witnesses
G. H. Walmsley
Clarence Shaw
Inventor
A. Lawrence
by O'Meara Co.
Attorneys
THE NORRIS PETERS CO., PHOTO-LITHO., WASHINGTON, D. C.

UNITED STATES PATENT OFFICE.

ABRAHAM LAWRENCE, OF NEW YORK, N. Y.

LAWN-TRIMMER.

SPECIFICATION forming part of Letters Patent No. 671,802, dated April 9, 1901.

Application filed October 6, 1900. Serial No. 32,270. (No model.)

*To all whom it may concern:*

Be it known that I, ABRAHAM LAWRENCE, a citizen of the United States, residing at New York city, in the State of New York, have invented a new and useful Lawn-Trimmer, of which the following is a specification.

This invention relates to an improved machine for trimming lawns; and the object is to provide a very simple, cheap, and effective construction for conveniently trimming the edges of lawns.

With the above object in view the invention consists in the novel features of construction hereinafter fully described, particularly pointed out in the claim, and clearly illustrated by the accompanying drawings, in which—

Figure 1 is a perspective view of a machine embodying my invention; Fig. 2, a vertical longitudinal sectional view of the same, and Fig. 3 a vertical transverse sectional view.

Referring now more particularly to the drawings, A designates a box constituting the body of the machine, mounted at its forward side upon a longitudinally-extending roller B and supported at its rear side by small wheels C. Mounted in the box and extending longitudinally thereof is a shaft or axle D, having one of its ends screw-threaded and projecting through one end of the box, as indicated by the letter E. Mounted upon said projecting end is a cutting-disk F, having its periphery sharpened, said disk being secured upon the axle by a nut G upon said threaded portion E, the disk being formed with a recess to receive said nut, so that the same is prevented from tearing the edge of the lawn. The machine is provided with a handle H, braced by rod I. Weights J are positioned in the box, which weights are equal to the resistance upon the disk when the latter is cutting, so that the machine is steadied and the cutter held in an operative position.

Having thus fully described my invention, what I claim as new, and desire to secure by Letters Patent of the United States, is—

A machine of the character described comprising a hollow box-like body, a roller mounted at the forward edge of said body and beneath the same, supporting-wheels mounted at the rear edge of the body, a handle secured to and extending upwardly and rearwardly from the body, a shaft extending longitudinally through said body and mounted therein and having one of its ends projecting therefrom, and a cutting-disk mounted on said shaft and disposed at one end of the body, substantially as described.

ABRAHAM LAWRENCE.

Witnesses:
CHAS. WILLEY,
FREEMAN T. HULSE.